US012567535B2

(12) United States Patent
Omiya et al.

(10) Patent No.: US 12,567,535 B2
(45) Date of Patent: Mar. 3, 2026

(54) MAGNETIC SHEET

(71) Applicant: TOKIN CORPORATION, Shiroishi (JP)

(72) Inventors: Tadashi Omiya, Sendai (JP); Masakazu Abe, Sendai (JP)

(73) Assignee: TOKIN CORPORATION, Shiroishi (JP)

( * ) Notice: Subject to any disclaimer, the term of this patent is extended or adjusted under 35 U.S.C. 154(b) by 870 days.

(21) Appl. No.: 17/682,380

(22) Filed: Feb. 28, 2022

(65) Prior Publication Data

US 2022/0285089 A1 Sep. 8, 2022

(30) Foreign Application Priority Data

Mar. 4, 2021 (JP) ................................ 2021-034194

(51) Int. Cl.

| | |
|---|---|
| ***H01F 27/36*** | (2006.01) |
| ***H01F 1/16*** | (2006.01) |
| ***H01F 1/22*** | (2006.01) |
| ***H01F 1/28*** | (2006.01) |

(52) U.S. Cl.

CPC ............. *H01F 27/366* (2020.08); *H01F 1/16* (2013.01); *H01F 1/22* (2013.01); *H01F 1/28* (2013.01)

(58) Field of Classification Search

CPC . H01F 27/366; H01F 1/16; H01F 1/22; H01F 1/28; B32B 15/18; B32B 7/12; B32B 15/09; B32B 15/20; B32B 27/36; H01B 7/17

See application file for complete search history.

(56) References Cited

U.S. PATENT DOCUMENTS

| | | | | |
|---|---|---|---|---|
| 9,455,071 | B2 | 9/2016 | Sumi et al. | |
| 10,418,161 | B2 * | 9/2019 | Masuda | .................... H01F 3/08 |
| 10,772,201 | B2 | 9/2020 | Ni et al. | |
| 10,772,202 | B2 | 9/2020 | Ni et al. | |

(Continued)

FOREIGN PATENT DOCUMENTS

| | | | |
|---|---|---|---|
| CN | 105321611 | A | 2/2016 |
| CN | 105593953 | A | 5/2016 |

(Continued)

OTHER PUBLICATIONS

English translation of JP 2019110166A (Year: 2019).*

(Continued)

*Primary Examiner* — Alicia Bland

(74) *Attorney, Agent, or Firm* — Holtz, Holtz & Volek PC

(57) ABSTRACT

A magnetic sheet is used as a noise reduction member for a cable. The magnetic sheet has a width of 5 mm to 15 mm. The magnetic sheet has a magnetic layer and a protective layer. The magnetic layer comprises soft-magnetic particles and a binder. Each of the soft-magnetic particles has a flat shape. A content of the soft-magnetic particles in the magnetic layer is from 35 vol % to 40 vol % with respect to the overall volume of the magnetic layer. The binder is made of polyacrylic rubber or of mixture of polyacrylic rubber and nitrile rubber. The binder binds the soft-magnetic particles to each other. A content of the binder in the magnetic layer is from 35 vol % to 65 vol % with respect to the overall volume of the magnetic layer. The protective layer reinforces the magnetic layer.

8 Claims, 1 Drawing Sheet

(56) References Cited

U.S. PATENT DOCUMENTS

| | | | | |
|---|---|---|---|---|
| 10,772,203 | B2 | 9/2020 | Ni et al. | |
| 10,827,612 | B2 | 11/2020 | Ni et al. | |
| 2005/0012652 | A1* | 1/2005 | Wakayama | H05K 9/0075 342/3 |
| 2021/0241956 | A1* | 8/2021 | Jang | H01F 38/14 |

FOREIGN PATENT DOCUMENTS

| | | | | |
|---|---|---|---|---|
| CN | 110556199 | A | | 12/2019 |
| CN | 110556200 | A | | 12/2019 |
| JP | 2000030943 | A | | 1/2000 |
| JP | 2003023286 | A | | 1/2003 |
| JP | 2006060008 | A | | 3/2006 |
| JP | 2006135118 | A | | 5/2006 |
| JP | 2009044069 | A | | 2/2009 |
| JP | 2014143215 | A | * | 8/2014 |
| JP | 2015092543 | A | | 5/2015 |
| JP | 2018088479 | A | | 6/2018 |
| JP | 2018156925 | A | | 10/2018 |
| JP | 2019110166 | A | * | 7/2019 |
| JP | 2020155685 | A | | 9/2020 |

OTHER PUBLICATIONS

English translation of JP 2014143215A (Year: 2014).*
English translation of JP2006060008A (Year: 2006).*
English translation of JP2006135118A (Year: 2006).*
Chinese Office Action (and an English language translation thereof) dated Jul. 9, 2025, issued in counterpart Chinese Application No. 202210190132.X.
Japanese Office Action (and an English language translation thereof) dated Aug. 28, 2024, issued in counterpart Japanese Application No. 2021-034194.

* cited by examiner

MAGNETIC SHEET

CROSS REFERENCE TO RELATED APPLICATIONS

This application is based on and claims priority under 35 U.S.C. § 119 to Japanese Patent Application No. JP2021-034194 filed Mar. 4, 2021, the contents of which are incorporated herein in their entirety by reference.

BACKGROUND OF THE INVENTION

This invention relates to a magnetic sheet for a cable.

It is well known that one way to reduce noise in a cable is to attach ferrite beads or ferrite cores to the cable. In general, ferrite cores or the like are bulky. If ferrite cores or the like are attached to numerous cables and the cables are bundled together to form a cable assembly, the cable assembly has a drawback that the ferrite cores or the like, which are attached to the cables, are very space consuming. Furthermore, in this case, the cable assembly has another drawback that a part of the cable assembly, to which the ferrite cores or the like are attached, has a size greater than a size of a remaining part of the cable assembly so that the cable assembly as a whole is aesthetically unattractive.

In order to prevent the aforementioned drawbacks, there is a requirement to use a sheet-like electromagnetic interference shielding member such as those of JPA 2009-44069 (Patent Document 1) for reducing noise in a cable.

SUMMARY OF THE INVENTION

It is therefore an object of the present invention to provide a magnetic sheet which is suitable for reducing noise in a cable One aspect of the present invention provides a magnetic sheet used as a noise reduction member for a cable. The magnetic sheet has a width of 5 mm to 15 mm. The magnetic sheet has a magnetic layer and a protective layer. The magnetic layer comprises soft-magnetic particles and a binder. Each of the soft-magnetic particles has a flat shape. A content of the soft-magnetic particles in the magnetic layer is from 35 vol % to 40 vol % with respect to the overall volume of the magnetic layer. The binder is made of polyacrylic rubber or of mixture of polyacrylic rubber and nitrile rubber. The binder binds the soft-magnetic particles to each other. A content of the binder in the magnetic layer is from 35 vol % to 65 vol % with respect to the overall volume of the magnetic layer. The protective layer reinforces the magnetic layer.

The magnetic sheet of the present invention is configures as follows: the content of the soft-magnetic particles in the magnetic layer is from 35 vol % to 40 vol % with respect to the overall volume of the magnetic layer; the binder is made of polyacrylic rubber or of mixture of polyacrylic rubber and nitrile rubber; and the content of the binder in the magnetic layer is from 35 vol % to 65 vol % with respect to the overall volume of the magnetic layer. Thus, the magnetic sheet of the present invention can reduce noise in a cable and is space saving as compared to ferrite cores. In other words, the magnetic sheet of the present invention is suitable for reducing noise in a cable.

An appreciation of the objectives of the present invention and a more complete understanding of its structure may be had by studying the following description of the preferred embodiment and by referring to the accompanying drawings.

Figure 1:
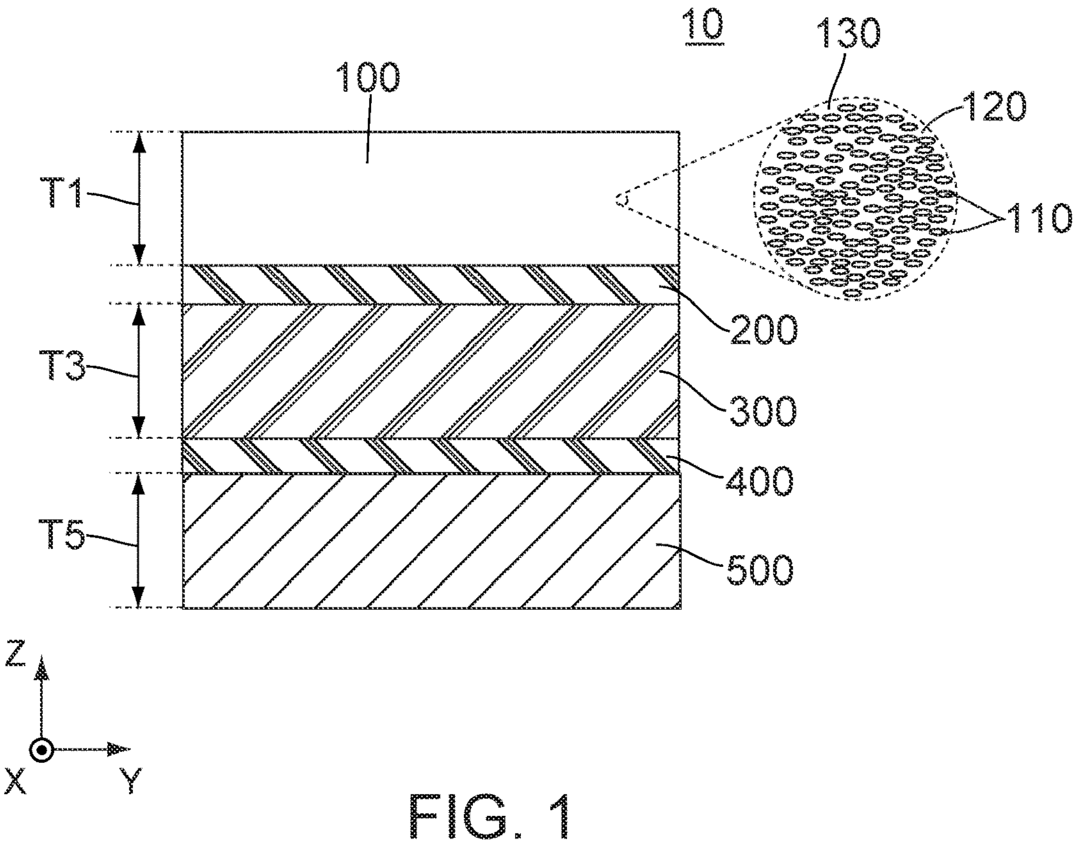
FIG. 1 is a cross-sectional view showing a magnetic sheet according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

[Magnetic Sheet]

Figure 2:
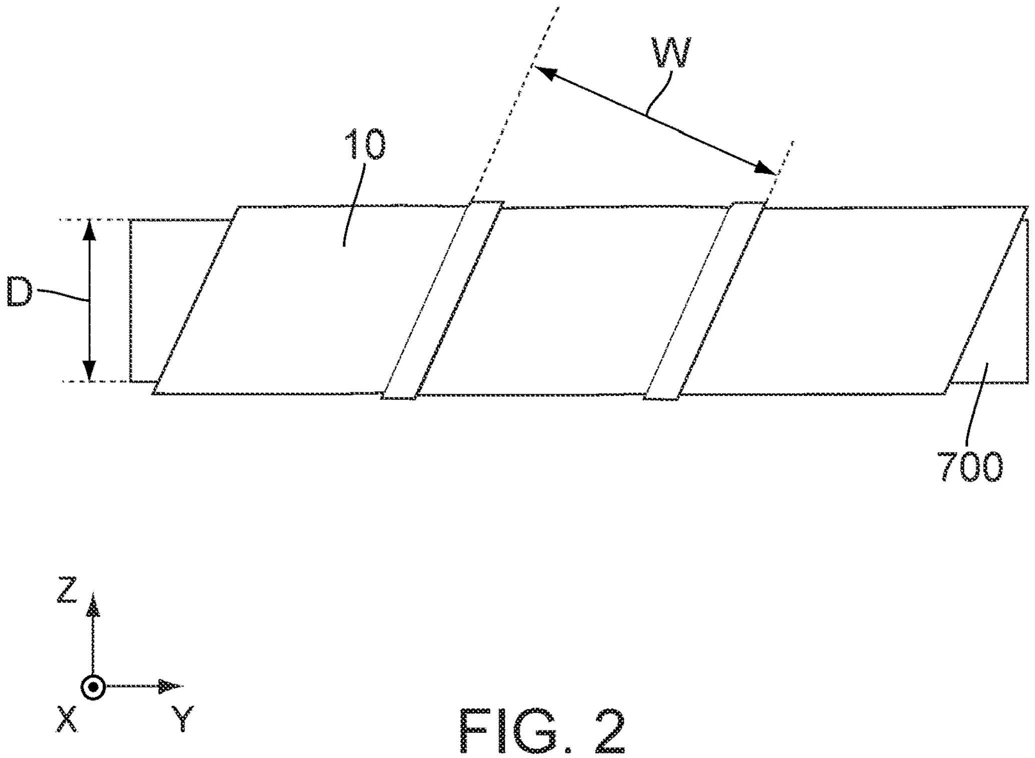
FIG. 2 is a view showing a state where the magnetic sheet of FIG. 1 is wound around a cable.

Referring to FIGS. 1 and 2, a magnetic sheet 10 according to an embodiment of the present invention is used as a noise reduction member for a cable 700. The magnetic sheet 10 has a width W which satisfies a condition $2.5 \leq W/D$, wherein D is a diameter D of the cable 700. If $\leq W/D < 2.5$, a ratio of each of overlapping parts of the magnetic sheet 10 relative to the width W of the magnetic sheet 10 upon winding the magnetic sheet 10 around the cable 700 is increased, and thereby the magnetic sheet 10 is hardly wound around the cable 700. Thus, it is not desirable for the magnetic sheet 10 to have the width W which satisfies a condition $W/D < 2.5$. For ensuring flexibility of the cable 700, around which the magnetic sheet 10 is wound, upon bending the cable 700, the magnetic sheet 10 is preferred to have the width W which satisfies $W/D \leq 7.5$. Specifically, the magnetic sheet 10 has the width W of 5 mm to 15 mm. If the magnetic sheet 10 has the width W of less than 5 mm, the ratio of each of the overlapping parts of the magnetic sheet 10 relative to the width W of the magnetic sheet 10 upon winding the magnetic sheet 10 around the cable 700 having the diameter D of 2 mm is increased, and thereby the magnetic sheet 10 is hardly wound around the cable 700. Thus, it is not desirable for the magnetic sheet 10 to have the width W of less than 5 mm. If the magnetic sheet 10 having the width W of over 15 mm is wound around the cable 700 having the diameter D of 2 mm, the cable 700 cannot be flexible upon bending the cable 700. Thus, it is not desirable for the magnetic sheet 10 to have the width W of over 15 mm.

As shown in FIG. 1, the magnetic sheet 10 according to the embodiment of the present invention has a magnetic layer 100 and a protective layer 300.

[Magnetic Layer]

Referring to FIG. 1, the magnetic layer 100 of the present embodiment has a thickness T1 of 20 μm to 100 μm. If the magnetic layer 100 has the thickness T1 of over 100 μm, cracks are produced on the overlapping parts of the magnetic sheet 10 which is wound around the cable 700 having the diameter D of 2 mm. Thus, it is not desirable for the magnetic sheet 10 to have the thickness T1 of over 100 μm.

As shown in FIG. 1, the magnetic layer 100 comprises soft-magnetic particles 110 and a binder 120.

[Soft-Magnetic Particles]

As shown in FIG. 1, each of the soft-magnetic particles 110 of the present embodiment has a flat shape. But, the present invention is not limited thereto. Specifically, each of the soft-magnetic particles 110 may have any shape. However, each of the soft-magnetic particles 110 is preferred to have the flat shape. It is desirable that most of the soft-magnetic particles 110 each having the flat shape are arranged so that the most of the soft-magnetic particles 110 are generally parallel to a main surface of the magnetic layer 100.

Preferred materials of the soft-magnetic particles 110 are magnetic stainless steel (Fe—Cr—Al—Si based alloy), Fe—Si—Al based alloy such as sendust (registered trademark), permalloy (Fe—Ni based alloy), silicon steel (Fe—Cu—Si based alloy), Fe—Si based alloy, Fe—Si—B(—Cu—Nb) based alloy, Fe—Ni—Cr—Si based alloy, Fe—Si—Cr based alloy, Fe—Si—Al—Ni—Cr based alloy, Mo—Ni—Fe based alloy and amorphous alloy. In particular, the soft-magnetic particles 110 are more preferred to be made of sendust. The soft-magnetic particles 110 may be made of a material selected from the preferred materials. Additionally, the soft-magnetic particles 110 may be made of two or more materials selected from the preferred materials. In particular, for improving magnetic permeability of the soft-magnetic particles 110, it is desirable for the soft-magnetic particles 110 to be made of metal alloy with high saturation magnetization.

In the magnetic sheet 10 of the present embodiment, a content of the soft-magnetic particles 110 in the magnetic layer 100 is from 35 vol % to 40 vol % with respect to the overall volume of the magnetic layer 100.

In the magnetic sheet 10 of the present embodiment, the soft-magnetic particles 110 have a median particle size D10 from 25 μm to 55 μm, where the median particle size D10 is a size of the soft-magnetic particle at 10 vol % on a cumulative distribution curve relating volume percentage to the sizes of the soft-magnetic particles 110. Additionally, in the magnetic sheet 10 of the present embodiment, the soft-magnetic particles 110 have a median particle size D50 from 55 μm to 90 μm, where the median particle size D50 is the size of the soft-magnetic particle at 50 vol % on the cumulative distribution curve relating volume percentage to sizes of the soft-magnetic particles 110. Furthermore, in the magnetic sheet 10 of the present embodiment, the soft-magnetic particles 110 have a median particle size D90 from 100 μm to 150 μm, where the median particle size D90 is the size of the soft-magnetic particle at 90 vol % on the cumulative distribution curve relating volume percentage to the sizes of the soft-magnetic particles 110.

[Binder]

Referring to FIG. 1, the binder 120 of the present embodiment is made of polyacrylic rubber or of mixture of polyacrylic rubber and nitrile rubber. In contrast, a magnetic sheet 10 including polyurethane as a binder 120 has a great elasticity and thereby the magnetic sheet 10 is hardly wound around the cable 700 having a small diameter D of about 2 mm. If the magnetic sheet 10 including polyurethane as the binder 120 is wound around the cable 700 having the diameter D of about 2 mm, there is a higher risk of cracking in the magnetic sheet 10 as compared to a case where the magnetic sheet 10 including polyacrylic rubber as the binder 120 is wound around the cable 700 having the same diameter. Thus, it is not desirable for the binder 120 to be made of polyurethane.

As shown in FIG. 1, the binder 120 binds the soft-magnetic particles 110 to each other. Specifically, a content of the binder 120 in the magnetic layer 100 is from 35 vol % to 65 vol % with respect to the overall volume of the magnetic layer 100. More specifically, the magnetic sheet 10 of the present embodiment satisfies the following condition: the content of the soft-magnetic particles 110 in the magnetic layer 100 is from 35 vol % to 40 vol % with respect to the overall volume of the magnetic layer 100; and the content of the binder 120 in the magnetic layer 100 is from 35 vol % to 65 vol % with respect to the overall volume of the magnetic layer 100. The content of the soft-magnetic particles 110 in the magnetic layer 100, whose binder 120 is polyacrylic rubber or mixture of polyacrylic rubber and nitrile rubber, is maximized under the condition. The content of the soft-magnetic particles 110 in the magnetic layer 100 should ideally be as high as possible in order to improve magnetic properties of the magnetic sheet 10. However, if the content of the soft-magnetic particles 110 in the magnetic layer 100 is over 40 vol %, the soft-magnetic particles 110 are poorly bound to each other by the binder 120, and the soft-magnetic particles 110 easily fall out from the manufactured magnetic sheet 10 and thereby the content of the soft-magnetic particles 110 in the magnetic layer 100 is decreased during usage of the magnetic sheet 10. Thus, it is not desirable for the content of the soft-magnetic particles 110 in the magnetic layer 100 to be over 40 vol %.

[Fire Retardant]

Referring to FIG. 1, the magnetic layer 100 of the present embodiment further includes a fire retardant 130. Specifically, the fire retardant 130 of the present embodiment is melamine cyanurate. However, the present invention is not limited thereto. Specifically, material of the fire retardant 130 should be flame retardant. The fire retardant 130 is preferred to be made of one of nitrogen-based compounds each having a decomposition temperature of 300° C. or higher. Nitrogen-based compounds suitable for material of the fire retardant 130 include, for example, tetrazole compounds, melamine compounds or mixtures of these compounds. Among the tetrazole compounds, bis-tetrazole diammonium ($C_2H_8N_{10}$) is a particularly preferred material of the fire retardant 130. Additionally, among the melamine compounds, melamine cyanurate is a particularly preferred material of the fire retardant 130.

A content of the fire retardant 130 in the magnetic layer 100 is 20 vol % or less with respect to the overall volume of the magnetic layer 100.

[Protective Layer]

As shown in FIG. 1, the protective layer 300 of the present embodiment reinforces the magnetic layer 100. The protective layer 300 of the present embodiment is made of PET (polyethylene terephthalate). However, the present invention is not limited thereto. Specifically, the protective layer 300 should be a sheet-like member having flexibility. The protective layer 300 may be made of resin other than PET. Specifically, the protective layer 300 may be made of, for example, polyvinyl chloride (PVC), polyurethane (PU), or polyimide (PI).

Referring to FIG. 1, the protective layer 300 has a thickness T3 of 12 μm or more. If the protective layer 300 has the thickness T3 of less than 12 μm, the protective layer 300 is easily stretched and is inconvenient to handle. Thus, it is not desirable for the protective layer 300 to have the thickness T3 of less than 12 μm. For ease of winding the magnetic sheet 10 around the cable 700 having a small diameter, the protective layer 300 is preferred to have the thickness T3 of 100 μm or less.

As shown in FIG. 1, the magnetic sheet 10 of the present embodiment further comprises an adhesive layer (second adhesive layer) 200. However, the present invention is not limited thereto. Specifically, the magnetic sheet 10 comprises no adhesive layer 200. In other words, the magnetic sheet 10 may be configured so that the magnetic layer 100 and the protective layer 300 are directly adhered to each other. More specifically, the magnetic sheet 10 may be a sheet as follows: the sheet is manufactured by applying a slurry, which is formed by mixing the soft-magnetic particles 110 and the binder 120, directly on the protective layer 300 by any of the following methods including doctor blading, spray coating, dip coating, roll coating, spin coating, curtain coating and screen printing; and the sheet is configured so that the magnetic layer 100 and the protective layer 300 are brought into close contact with each other. However, the aforementioned sheet is configured so that the magnetic layer 100 is formed directly on the protective layer 300 without the intermediary of the adhesive layer 200. Thus, the aforementioned sheet has a risk that the magnetic layer 100 is detached from the protective layer 300. Thus, the magnetic sheet 10 is preferred to have the adhesive layer 200 in order to create an adhesive force between the magnetic layer 100 and the protective layer 300.

[Adhesive Layer]

As shown in FIG. 1, the adhesive layer 200 of the present embodiment adheres the magnetic layer 100 and the protective layer 300 to each other. The adhesive layer 200 consists of polyether based adhesive or polyester based adhesives. For improving adhesion of the adhesive layer 200 to the magnetic layer 100 whose binder 120 is polyacrylic rubber or mixture of polyacrylic rubber and nitrile rubber, the adhesive layer 200 is particularly preferred to consist of polyether based adhesive. It is noted that acrylic adhesive has poor adhesion to the magnetic layer 100 whose binder 120 is polyacrylic rubber or mixture of polyacrylic rubber and nitrile rubber. Thus, it is not desirable for the adhesive layer 200 to consist of acrylic adhesive.

The magnetic sheet 10, whose adhesive layer 200 is thin, is easier to be wound around the cable 700 having a small diameter. Thus, a thickness of the adhesive layer 200 should be as small as possible. Specifically, the adhesive layer 200 should have the thickness of at most 5 μm. Additionally, the adhesive layer 200 is preferred to have the thickness of, for example, less than 1 μm. In order that the magnetic layer 100 is properly formed above the protective layer 300 while the magnetic layer 100 and the protective layer 300 are strongly adhered to each other, the adhesive layer 200 is preferred to have a certain thickness. Specifically, the adhesive layer 200 is preferred to have the thickness of, for example, 0.5 μm or more.

As shown in FIG. 1, the magnetic sheet 10 of the present embodiment further comprises a metal layer 500 and an additional adhesive layer (first adhesive layer) 400.

[Metal Layer]

Referring to FIG. 1, the metal layer 500 of the present embodiment is made of Al or Cu. The metal layer 500 has a thickness T5 of 7 μm or more. If the metal layer 500 has the thickness T5 of less than 7 μm, the magnetic sheet 10 does not have sufficient shielding. Thus, it is not desirable for the metal layer 500 to have the thickness T5 of less than 7 μm. For ease of winding the magnetic sheet 10 around the cable 700 having a small diameter, the metal layer 500 is preferred to have the thickness T5 of 30 μm or less.

[Additional Adhesive Layer]

As shown in FIG. 1, the additional adhesive layer 400 of the present embodiment adheres the metal layer 500 and the protective layer 300 to each other. The magnetic sheet 10, whose the additional adhesive layer 400 is thin, is easier to be wound around the cable 700 having a small diameter. Thus, a thickness of the additional adhesive layer 400 should be as small as possible. Specifically, the additional adhesive layer 400 should have the thickness of at most 5 μm. Additionally, the additional adhesive layer 400 is preferred to have the thickness of, for example, less than 1 μm.

[Method of Manufacturing the Magnetic Sheet]

Hereinafter, description will be made in detail about one example of a method of manufacturing the magnetic sheet 10.

First, a manufacturer prepares particles, as the soft-magnetic particles 110, each of which is made of sendust (registered trademark) and has a flat shape. In addition, the manufacturer prepares polyacrylic rubber as the binder 120. The particles made of sendust (registered trademark) have a median particle size D10 of 40 μm, where the median particle size D10 is a size of the particle at 10 vol % on a cumulative distribution curve relating volume percentage to the sizes of the particles. In addition, the particles made of sendust (registered trademark) have a median particle size D50 of 75 μm, where the median particle size D50 is the size of the particle at 50 vol % on the cumulative distribution curve relating volume percentage to sizes of the soft-magnetic particles 110. Furthermore, the particles made of sendust (registered trademark) have a median particle size D90 of 130 μm, where the median particle size D90 is the size of the particle at 90 vol % on the cumulative distribution curve relating volume percentage to the sizes of the particles. Next, the particles made of sendust (registered trademark) and the polyacrylic rubber are mixed to form viscous slurry. After that, the slurry is coated on a carrier film made of PET by doctor blading and is dried. Then, the dried slurry is pressed by a roller and is removed from the carrier film. Thus, the manufacturer obtains the removed slurry as a magnetic thin film. However, the present invention is not limited thereto. Specifically, the magnetic thin film may be formed by removing the dried slurry itself from the carrier film without pressing the dried slurry by the roller.

Then, an adhering process is performed as follows: the thus obtained magnetic thin film is adhered to a PET film by polyether based adhesive to from a composite thin film. Thus, the magnetic thin film becomes the magnetic layer 100, the PET film becomes the protective layer 300 and the polyether based adhesive becomes the adhesive layer 200.

After that, the composite thin film, which consists of the magnetic layer 100, the adhesive layer 200 and the protective layer 300, is adhered to a thin metal film, which is made of Al, by polyether based adhesive. Then, the thin metal film becomes the metal layer 500 and the polyether based adhesive, which is interposed between the composite thin film and the metal layer 500, becomes the additional adhesive layer 400. Thus, the manufacturer obtains the magnetic sheet 10.

The manufactured magnetic sheet 10 has a width W of 5 mm, wherein: the magnetic layer 100 has a thickness T1 of 50 μm; the protective layer 300 has a thickness T3 of 12 μm; and the metal layer 500 has a thickness T5 of 7 μm. In the manufactured magnetic sheet 10, a content of the soft-magnetic particles 110 in the magnetic layer 100 is 38 vol % with respect to the overall volume of the magnetic layer 100. In the manufactured magnetic sheet 10, a content of the binder 120 in the magnetic layer 100 is 45 vol % with respect to the overall volume of the magnetic layer 100. The remaining content in the magnetic layer 100 of the manufactured magnetic sheet 10 is void.

Although the aforementioned magnetic sheet 10 is manufactured by adhering the magnetic thin film, which is formed by doctor blading, to the PET film which is different from and other than the carrier film, the present invention is not limited thereto. The magnetic sheet 10 may be manufactured, for example, as follows: the carrier film, on which the magnetic thin film is formed, is adhered to the meal thin film by adhesive without the adhering process where the magnetic thin film is adhered to the PET film. It is noted that the thus manufactured magnetic sheet 10 has no adhesive layer 200. In other words, the thus manufactured magnetic sheet 10 is configured so that the magnetic layer 100 consisting of the magnetic thin film is directly adhered to a protective layer 300 consisting of the carrier film.

Instead of by the manufacturing method described above, the magnetic sheet 10 may be manufactured as follows. First, the soft-magnetic particles 110 and the binder 120 are mixed to form the slurry. Next, the slurry is coated on a PET film, which has no release agent, by, for example, doctor blading and is dried, and thereby an untreated composite film consisting of the dried slurry and the PET film is formed. After that, the dried slurry of the untreated composite film is pressed by the roller. Then, the pressed slurry becomes the magnetic layer 100, and the PET film becomes the protective layer 300, and thereby the manufacturer obtains a composite thin film consisting of the protective layer 300 and the magnetic layer 100 which is formed directly on the protective layer 300. Next, a copper thin film, on which polyether based adhesive is applied, is adhered to the PET film of the obtained composite thin film. Then, the copper thin film becomes the metal layer 500 and the polyether based adhesive, which is interposed between the composite thin film and the metal layer 500, becomes the additional adhesive layer 400. Thus, the manufacturer obtains the magnetic sheet 10 having no adhesive layer 200. Although the composite thin film is formed by pressing the dried slurry of the untreated composite film by the roller in this manufacturing method, the untreated composite film consisting of the PET film and the dried slurry, which is not pressed by the roller, may be used as it is as the composite thin film.

Although the specific explanation about the present invention is made above referring to the embodiments, the present invention is not limited thereto and is susceptible to various modifications and alternative forms.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A magnetic sheet adapted to be used as a noise reduction member for a cable, wherein:

the magnetic sheet has a width of 5 mm to 15 mm;

the magnetic sheet has a magnetic layer and a protective layer;

the magnetic layer comprises soft-magnetic particles and a binder;

each of the soft-magnetic particles has a flat shape;

a content of the soft-magnetic particles in the magnetic layer is from 35 vol % to 40 vol % with respect to the overall volume of the magnetic layer;

the binder is made of polyacrylic rubber or of a mixture of polyacrylic rubber and nitrile rubber;

the binder binds the soft-magnetic particles to each other;

a content of the binder in the magnetic layer is from 35 vol % to 65 vol % with respect to the overall volume of the magnetic layer;

the protective layer reinforces the magnetic layer;

the magnetic sheet further comprises a metal layer and a first adhesive layer;

the metal layer is made of Al or Cu;

the metal layer has a thickness of 7 μm or more; and the first adhesive layer adheres the metal layer and the protective layer to each other.

2. The magnetic sheet as recited in claim 1, wherein:

the magnetic layer further includes a fire retardant; and a content of the fire retardant in the magnetic layer is 20 vol % or less with respect to the overall volume of the magnetic layer.

3. The magnetic sheet as recited in claim 1, wherein the magnetic layer has a thickness of 20 μm to 100 μm.

4. The magnetic sheet as recited in claim 1, wherein the soft-magnetic particles have a median particle size D50 from 55 μm to 90 μm, where the median particle size D50 is a size of the soft-magnetic particle at 50 vol % on a cumulative distribution curve relating volume percentage to sizes of the soft-magnetic particles.

5. The magnetic sheet as recited in claim 4, wherein:

the soft-magnetic particles have a median particle size D10 from 25 μm to 55 μm, where the median particle size D10 is the size of the soft-magnetic particle at 10 vol % on the cumulative distribution curve relating volume percentage to the sizes of the soft-magnetic particles; and the soft-magnetic particles have a median particle size D90 from 100 μm to 150 μm, where the median particle size D90 is the size of the soft-magnetic particle at 90 vol % on the cumulative distribution curve relating volume percentage to the sizes of the soft-magnetic particles.

6. The magnetic sheet as recited in claim 1, wherein:

the magnetic sheet further comprises a second adhesive layer; and the second adhesive layer adheres the magnetic layer and the protective layer to each other.

7. The magnetic sheet as recited in claim 6, wherein the second adhesive layer is made of polyether-based adhesive or polyester-based adhesive.

8. The magnetic sheet as recited in claim 1, wherein:

the protective layer is made of PET (polyethylene terephthalate); and the protective layer has a thickness of 12 μm or more.

* * * * *